United States Patent
Fortenbaugh

(10) Patent No.: US 9,682,767 B2
(45) Date of Patent: Jun. 20, 2017

(54) COLLECTIVE PITCH INTEGRATION WITH CONTROL POWER MANAGEMENT SYSTEM

(71) Applicant: Robert L. Fortenbaugh, Pantego, TX (US)

(72) Inventor: Robert L. Fortenbaugh, Pantego, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 762 days.

(21) Appl. No.: 14/136,147

(22) Filed: Dec. 20, 2013

(65) Prior Publication Data

US 2015/0175254 A1   Jun. 25, 2015

(51) Int. Cl.
*B64C 13/16* (2006.01)
*B64C 27/57* (2006.01)
*B64C 29/00* (2006.01)

(52) U.S. Cl.
CPC .............. *B64C 13/16* (2013.01); *B64C 27/57* (2013.01); *B64C 29/0033* (2013.01)

(58) Field of Classification Search
CPC ...... B64C 13/16; B64C 27/57; B64C 29/0033
See application file for complete search history.

(56) References Cited

U.S. PATENT DOCUMENTS

| 7,873,445 | B2* | 1/2011 | Schaeffer | B64C 29/0033 |
| | | | | 244/7 R |
| 8,435,002 | B2* | 5/2013 | Jolly | B64C 27/001 |
| | | | | 415/1 |
| 8,496,199 | B2 | 7/2013 | Fortenbaugh | |
| 2005/0042094 | A1* | 2/2005 | Occhiato | G01D 7/02 |
| | | | | 416/61 |
| 2006/0083617 | A1* | 4/2006 | Jolly | B64C 27/001 |
| | | | | 416/133 |
| 2006/0219840 | A1* | 10/2006 | Einthoven | G05D 1/0858 |
| | | | | 244/17.13 |
| 2009/0236468 | A1* | 9/2009 | Welsh | B64C 27/001 |
| | | | | 244/17.13 |
| 2011/0180656 | A1* | 7/2011 | Shue | G05D 1/0077 |
| | | | | 244/17.13 |

OTHER PUBLICATIONS

Search Report dated Aug. 26, 2014 from counterpart EP App. No. 14157086.1.
Examination Report dated Sep. 9, 2014 from counterpart EP App. No. 14157086.1.
Office Action dated Feb. 25, 2016 from counterpart Candian App. No. 2,873,008.

* cited by examiner

*Primary Examiner* — Justin Benedik
(74) *Attorney, Agent, or Firm* — James E. Walton

(57) ABSTRACT

A control system having a series of control loops for determining the upper and lower cyclic limit increments due to the contribution of collective pitch in rotorcraft based at least on nacelle angle and airspeed.

14 Claims, 3 Drawing Sheets

COLLECTIVE PITCH INTEGRATION WITH CONTROL POWER MANAGEMENT SYSTEM

BACKGROUND

1. Field of the Invention

The present application relates generally to flight control systems, and more specifically, to an aircraft flight control system for controlling rotor blade flapping introduced by collective pitch.

2. Description of Related Art

All rotor systems are subject to dissymmetry of lift in forward flight. During hover, the lift is equal across the entire rotor disk. As the helicopter gains airspeed, the advancing rotor blade develops greater lift because of the increased airspeed. For example, rotor blades at hover move at 300 knots and in forward flight at 100 knots the advancing blades move at a relative speed of 400 knots and while the retreating blades move at 200 knots. This has to be compensated for in some way, or the helicopter would corkscrew through the air doing faster and faster snap rolls as airspeed increased.

Dissymmetry of lift is compensated for by blade flapping. Because of the increased airspeed (and corresponding lift increase) on the advancing rotor blade, the rotor blade flaps upward. Decreasing speed and lift on the retreating rotor blade causes the blade to flap downward. This induced flow through the rotor system changes the angle of attack on the rotor blades and causes the upward-flapping advancing rotor blade to produce less lift, and the downward-flapping retreating rotor blade to produce a corresponding lift increase. Some rotor system designs require that flapping be limited by flapping stops which prevent damage to rotor system components by excessive flapping. In addition to structural damage, aircraft control can be compromised if the rotor flaps into the stop. Thus it becomes incumbent on the aircraft designer to control flapping and warn of this hazardous condition. This application addresses this requirement. Although the foregoing developments represent great strides in the area of flapping detection and reduction, many shortcomings remain.

Previous attempts to reduce flapping by limiting cyclic control inputs, such as was disclosed by U.S. Pat. No. 8,496,199, which is hereby incorporated by reference as if fully set forth, only considered rotor flapping and cyclic control positions as inputs. Furthermore, previous attempts have been forced to first measure flapping and then react to the flapping. For example, in forward flight at speeds greater than 40 KCAS in conversion mode, flapping due to collective can be as high as 1 degree per degree of collective pitch input. This flapping contribution can not be acted upon by previous CPMS implementations until it is sensed.

Equation (1) shows the upper limits of Control Power Management System (CPMS) CPMS-based longitudinal cyclic limits, respectively.

$$B_{ULIM} = BB_{long} + \sqrt{(F_{MAX}^2 - b_1^2)} \quad (1)$$

Equation (2) shows the lower limits of Control Power Management System (CPMS) CPMS-based longitudinal cyclic limits, respectively.

$$B_{LLIM} = BB_{long} - \sqrt{(F_{MAX}^2 - b_1^2)} \quad (2)$$

where $B\_ULIM$=upper CPMS-based longitudinal cyclic command limit, $B\_LLIM$=lower CPMS-based longitudinal cyclic command limit, $BB\_long$ is the longitudinal component of blowback, $F\_max$ is the design maximum total flapping, and $b\_1$ is the lateral component of flapping.

Experience with tiltrotors has shown that more effective flapping control is possible if collective pitch is made available to the CPMS.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
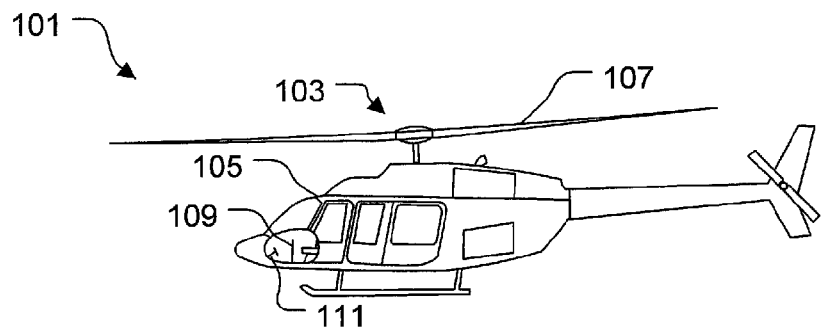
FIG. 1 is a side view of a rotary aircraft.

While the system and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

The system and method of the present application overcomes the abovementioned problems commonly associated with conventional aircraft control systems. The control system comprises a subsystem adapted to modifying predetermined flight control limits for a particular aircraft. The subsystem determines whether the aircraft is operating within or near an impending hazardous flight condition, which, in the exemplary embodiments, are conditions where excessive blade flapping occurs. Further description and illustration of the control system and method is provided in the figures and disclosure below.

It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of the present application will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

Because previous attempts were limited by first having to measure flapping before reacting to, a new system and method that predicts flapping resulting from collective pitch is required for aircraft flying at airspeeds greater than 40 KCAS. This system and method works by incrementing the cyclic limits computed with the CPMS system with a component derived from collective pitch. The commanded collective pitch input is processed by an empirically determined gain time a lagged washout which multiples the reconstituted flapping per degree collective pitch derivatives to generate the increments to be added to the upper and lower cyclic limits computed by the CPMS system. In order to add the effect of collective pitch into the CPMS algorithm Equation 1 and Equation 2 are differentiated with respect to collective pitch with the assumptions that F_max is a constant and not a function of collective pitch and cyclic pitch in the blowback relation is likewise not a function of collective pitch. Thereby creating $$\frac{\partial B_{1LL}}{\partial \theta_0} = \frac{\partial a_1}{\partial \theta_0} + \frac{b_1}{\sqrt{(F_{MAX}^2 - b_1^2)}} \times \frac{\partial b_1}{\partial \theta_0} \quad (3)$$

$$\frac{\partial B_{1UL}}{\partial \theta_0} = \frac{\partial a_1}{\partial \theta_0} - \frac{b_1}{\sqrt{(F_{MAX}^2 - b_1^2)}} \times \frac{\partial b_1}{\partial \theta_0} \quad (4)$$

where B_1LL=lower CPMS-based longitudinal cyclic command limit, B_1UL=upper CPMS-based longitudinal cyclic command limit, $\Theta\_0$ is the collective pitch, a_1 is longitudinal flapping, F_max is the design maximum total flapping, and b_1 is the lateral component of flapping. It should be noted that the upper CPMS-based longitudinal cyclic limit based on collective pitch is defined by the "−" sign on the SQRT function and the lower limit is defined by the "+" sign.

It should be noted that F_max is a function of aircraft variables (e.g., airspeed, nacelle) and tuned using empirical data and knowledge of the accuracy of the flapping measurements and the flapping stop limit.

Ideally, the single tuning parameter of the algorithm, Fmax, would be set to the design flapping limit. In practice, however, Fmax must be set to be less than the design limit based on considerations of flapping measurement accuracy and flight test results. In the preferred embodiment, Fmax is generally a function of airspeed. However, it will be appreciated that Fmax could be a function of other flight parameters. With provisions in the developmental flight control system to vary parameters in flight, Fmax can be rapidly and efficiently tuned to accommodate the flapping occurring in the worst case maneuvers expected of the aircraft.

Figure 2:
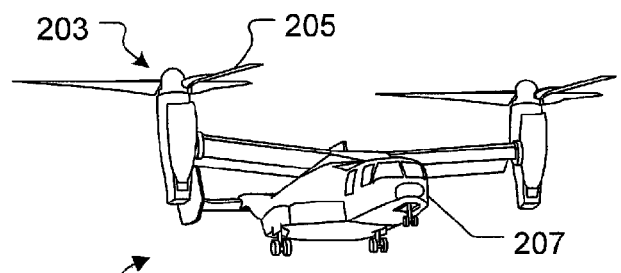
FIG. 2 is an oblique view of a tiltrotor aircraft.

Referring now to the drawings, FIGS. 1 and 2 show two different rotary aircraft utilizing the flight control system of the present application. FIG. 1 shows a side view of a helicopter 101, while FIG. 2 shows an oblique view of a tiltrotor aircraft 201. The flight control system is preferably utilized in tiltrotor aircraft 201 during low speeds and with a fixed lateral cyclic. However, it will be appreciated that the control system is easily and readily adaptable for use with other types of rotary aircraft, i.e., helicopter 101, operating at various speeds and with or without a fixed lateral cyclic control.

Helicopter 101 comprises a rotary system 103 carried by a fuselage 105. One or more rotor blades 107 operably associated with rotary system 103 provide flight for helicopter 101 and are controlled with a plurality of controllers within fuselage 105. For example, during flight a pilot can manipulate the cyclic controller 109 for changing the pitch angle of rotor blades 107, thus providing lateral and longitudinal flight direction, and/or manipulate pedals 111 for controlling yaw direction.

Tiltrotor aircraft 201 includes two or more rotary systems 203 carried by rotatable nacelles. The rotatable nacelles enable aircraft 201 to takeoff and land like a conventional helicopter, thus the rotary systems of tiltrotor 201 are susceptible to excessive flapping of the rotor blades 205 caused by control of the rotor blades, rotor system rotation, and the rotor operating environment such as wind speed and direction. In the preferred embodiment, the control system of the present application is carried within fuselage 207 for assisting the pilot during flight. It should be understood that, like helicopter 101, tiltrotor aircraft 201 comprises a cyclic controller and pedals for manipulating lateral, longitudinal, and yaw control.

For ease of description, some of the required systems and devices operably associated with the present control system are not shown, i.e., sensors, connectors, power sources, mounting supports, circuitry, software, and so forth, in order to clearly depict the novel features of the system. However, it should be understood that the system of the present application is operably associated with these and other required systems and devices for operation, as conventionally known in the art, although not shown in the drawings.

Figure 3A:
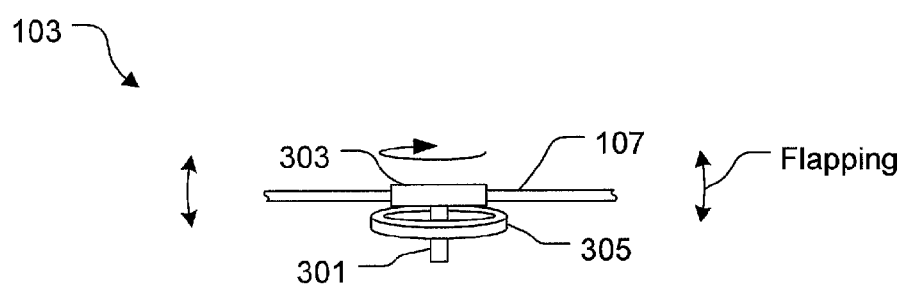
FIGS. 3A and 3B are oblique views of a rotary system.
Figure 3B:
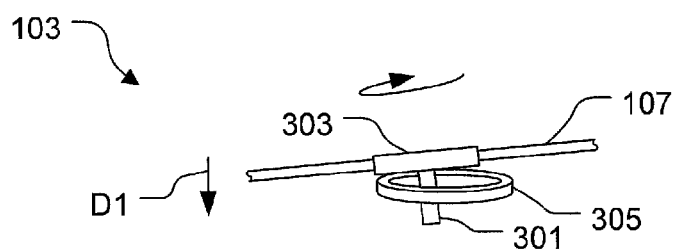

Referring to FIGS. 3A and 3B in the drawings, oblique views of rotary system 103 are shown. FIG. 3A shows rotary system 103 during normal operation, while FIG. 3B shows rotary system 103 during hazardous flight conditions, i.e., the rotary system experiencing excessive flapping. Rotary system 103 comprises a mast 301 rotatably attached to rotor blades 107 via a rotor yoke 303. One or more restraints 305 and/or other nearby structures are positioned alongside mast 301. In the exemplary embodiment, restraints 305 are conventional "stops" adapted to restrain the tilting of the hub. It should be understood that both helicopter 101 and tiltrotor 201, along with other types of rotary aircraft, are susceptible to excessive flapping, which could result in damage to the rotary system.

During flight, the rotation of mast 301 combined with the pitching of rotor blades 107 causes flapping, as depicted with vertical arrows. Excessive flapping can cause yoke 303 to tilt in direction D1, as indicated with the vertical arrow, which in turn could cause the yoke to come into contact with restraint 305, resulting in damage to components of the rotor system and/or restraint 305, and in some scenarios, resulting in catastrophic failure. It will be appreciated that one of the novel features of the control system of the present application is to assist the pilot in controlling flight of the aircraft to avoid contact between yoke 303 and restraint 305.

Figure 4:
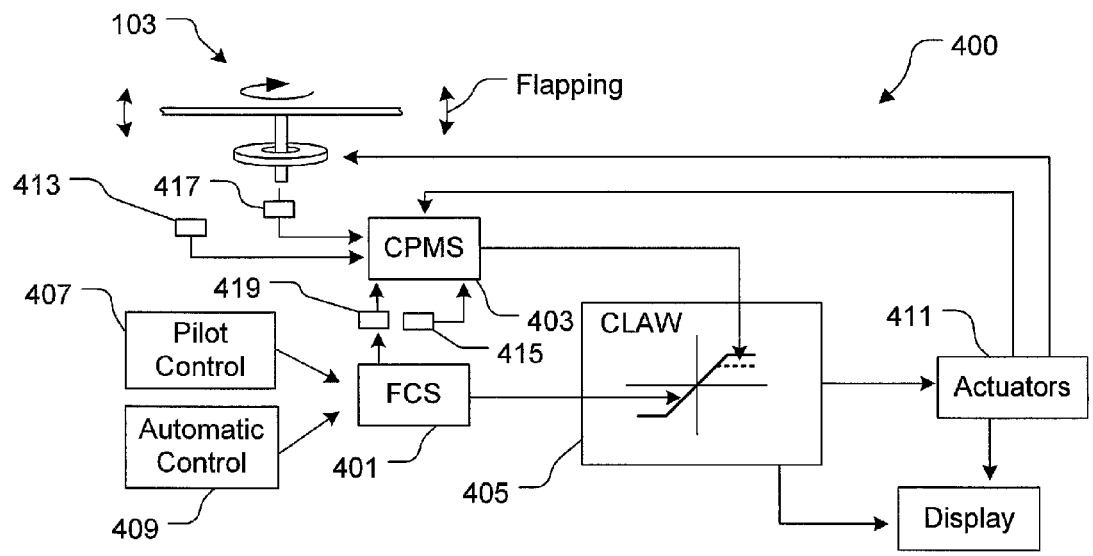
FIG. 4 is a schematic of the flight control system according to the preferred embodiment of the present application.

Referring to FIG. 4 in the drawing, a schematic view of flight control system 400 is shown. System 400 further comprises a flight control subsystem (FCS) 401 and a control power management subsystem 403 (CPMS). Both FCS 401 and CPMS 403 are operably associated with one another to assist the pilot to avoid excessive flapping.

Box 405, labeled as flight control laws (CLAW), depicts the outcome flight control limits generated by both FCS 401 and CPMS 403. As is shown, a solid line represents the original flight control limits, while the dashed line represents the modified flight control limits, i.e., the solid line being lowered with application of CPMS 403. It should be understood that CPMS 403 only limits the flight control limits while the aircraft is flying in or near impending hazardous flight conditions, i.e., excessive blade flapping. Optionally, the modified flight control limits may be thereafter displayed to the pilot via a MFD or other suitable display.

In the preferred embodiment, pilot controller commands 407, i.e., from cyclic controller 109 and/or pedal 111, along with automatic aircraft controls 409, are received by FCS 401, then relayed to aircraft actuators 411.

CPMS 403 is preferably operably associated with a first sensor 413 adapted to sense the angle of the nacelles, a second sensor 415 adapted to sense airspeed, and a third sensor 417 adapted to sense both lateral and longitudinal flapping of the rotor. CPMS 403 is provided with a flapping limiting algorithm, which receives sensed data from sensor 413, sensor 415, sensor 417, and commanded collective pitch 419 from FCS 401 to generate control limit envelopes. As discussed, the nacelle angle and airspeed changes during flight, thereby changing the amount of flapping introduced by collective pitch, thus resulting in changing control limits generated by CPMS 403.

Figure 5:
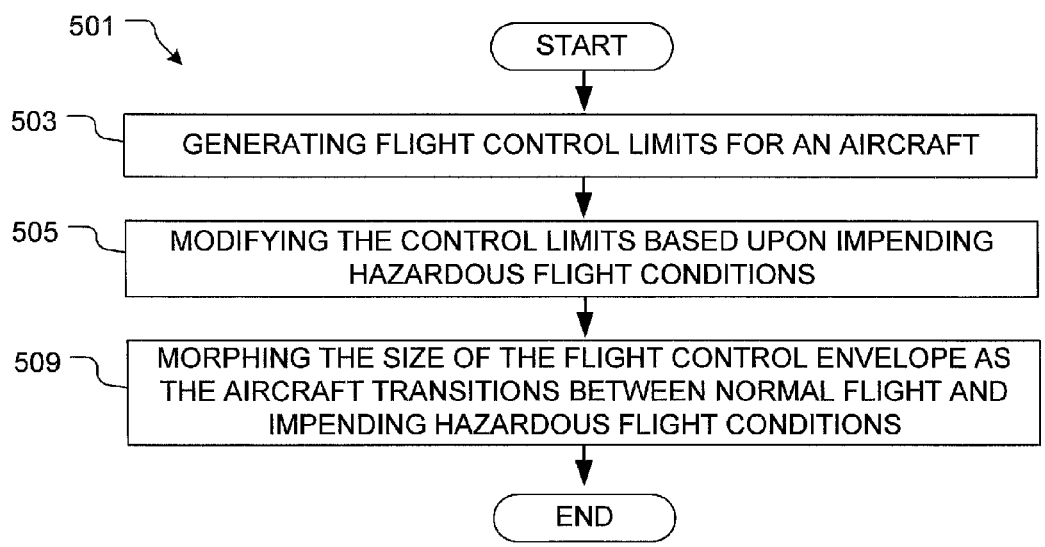
FIG. 5 is a flow chart depicting the preferred method according to the preferred embodiment of the present application.

Referring to FIG. 5 in the drawings, a flowchart 501 depicting the preferred method is shown. Box 503 shows the first step, which includes generating control limits for the aircraft, which are predetermined control limits for the particular aircraft. In the preferred method, the combined commanded pilot controls and the automatic aircraft controls are limited by the flight control margins. Box 505 depicts the next step, which includes modifying the control limits to avoid impending hazardous conditions, i.e., excessive flapping. This step is achieved with CPMS via a flapping limiting algorithm operably associated with the aircraft rotary system and the aircraft actuators. The next step morphing the envelope as the aircraft approaches impending hazardous flight conditions, as depicted in box 509.

Figure 6:
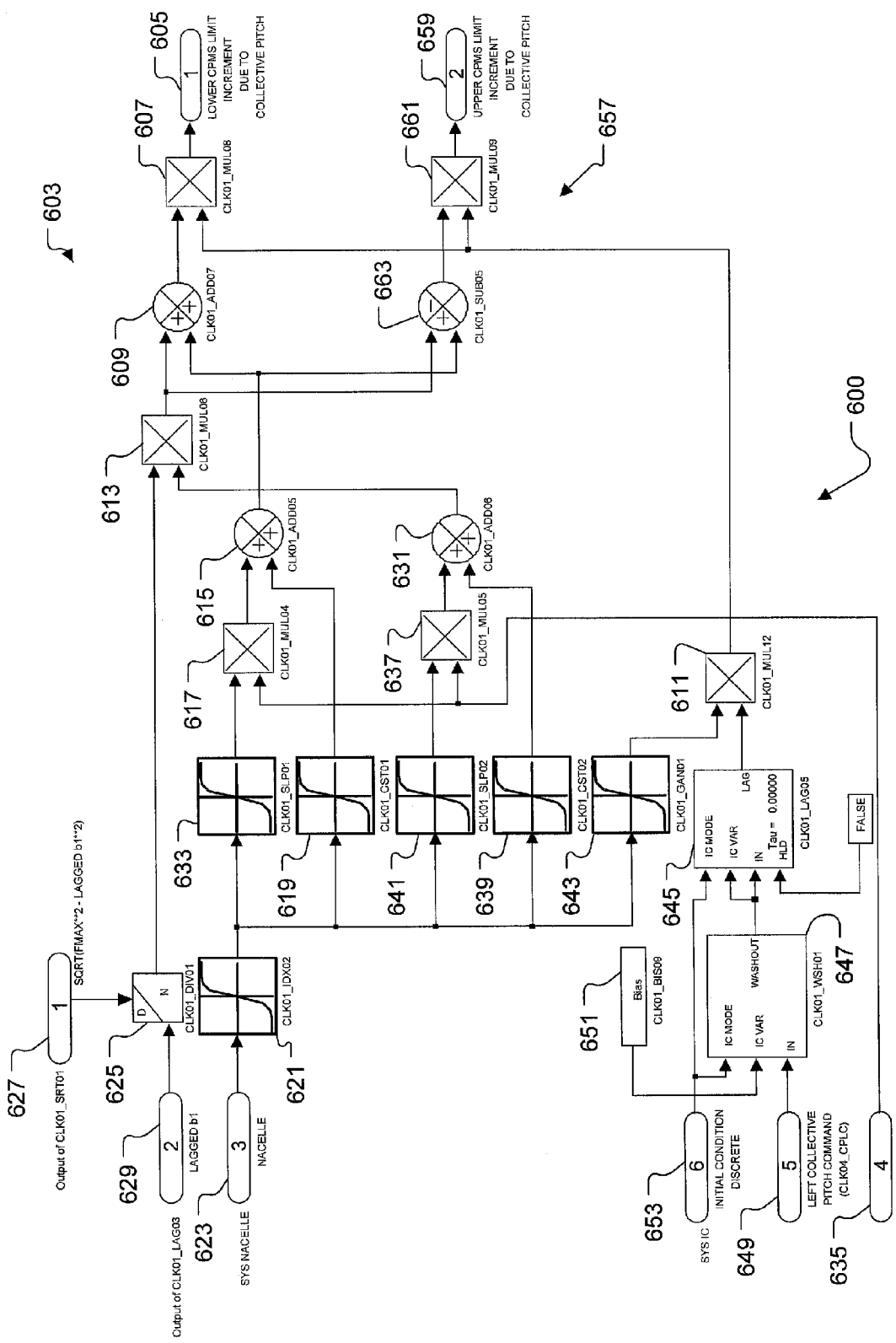
FIG. 6 is a schematic of the collective integration modification of the control power management subsystem (CPMS).

Referring now also to FIG. 6 in the drawings, a schematic depicting the preferred incorporation of collective pitch into the CPMS module for the left rotor is illustrated. FIG. 6 (subsystem 600) provides a detailed view of the algorithm utilized with subsystem 403. In particular, the algorithm is implemented in the flight control system software and receives data such as airspeed, nacelle angle, longitudinal and lateral flapping, amount of collective pitch, and the position of the lateral and longitudinal cyclic actuators as inputs. Thereafter, the algorithm modifies the CPMS-based cyclic control limits which may in turn limit the cyclic control commands of the flight control system. It should be appreciated that the algorithm is repeated for each rotor when implemented on a tiltrotor aircraft.

First control loop 603 determines the lower CPMS limit increment due to collective pitch 605 as shown in Equation 4. The lower CPMS limit increment due to collective pitch 605 once determined, because it is an increment would then be added to the conventional lower CPMS limit to form the adjusted lower CPMS limit.

The lower CPMS limit increment due to collective pitch 605 is the product 607 of sum 609 and product 611. Sum 609 is the sum of product 613 together with sum 615. Sum 615, the differentiated longitudinal flapping divided by the collective pitch, is the sum of product 617 and the result of constant one lookup table 619. Constant one lookup table 619 is based on the result of index lookup table 621. Index lookup table is based upon the nacelle angle 623. Nacelle angle 623 in the preferred embodiment is the based upon the measured nacelle angle from the first sensor 413, however it should be apparent that commanded nacelle angle from the FCS 401 is a suitable alternative. Product 613 is the result of multiplying the division 625 with the sum 631. Division 625 is the result of dividing the lateral flapping 629 by the input one 627. Lateral flapping 629 in the preferred embodiment is lagged, however other embodiments utilize a non-lagged lateral flapping. Furthermore, lateral flapping 629 is the result of a transducer measuring actual lateral flapping such as the third sensor 417.

Input one 627 is the result of Equation 5.

$$\text{Input one} = \sqrt{(F_{MAX}^2 - b_1^2)} \qquad (5)$$

where F_max is the design maximum total flapping, and b_1 is the lagged lateral component of flapping.

Product 617 is the result of multiplying slope one lookup table 633 by the airspeed 635. Airspeed 635 in the preferred embodiment is the FCS 401 airspeed, which is based on conditioning of a transducer measuring actual airspeed. Slope one lookup table 633 is based on the result of index lookup table 621.

Sum 631, the differentiated lateral flapping divided by the collective pitch, is the sum of product 637 and the result of constant two lookup table 639. Constant two lookup table 639 is based on the result of index lookup table 621. Product 637 is the result of multiplying slope two lookup table 641 by the airspeed 635. Slope two lookup table 641 is based on the result of index lookup table 621.

Product 611 is the result of multiplying gain lookup table 643 with filter 645. Gain lookup table 643 is based on the results of index lookup table 621. Filter 645 filters the washedout left collective pitch command 647. Filter 645 is optional as need to filter out high frequencies. Washedout left collective pitch command 647 is the commanded left collective pitch command 649 from the FCS 401. The commanded left collective pitch command 649 is washed out to reduce or eliminate trim collective conditions such that only dynamic collective pitch inputs are reacted to by the system 600. Washedout left collective pitch command 647 has a bias 651 to reset the amount of washout, when the FCS 401 initial condition discrete 653 is TRUE.

Second control loop 657 determines the upper CPMS limit increment due to collective pitch 659 as also shown in Equation 3. The upper CPMS limit increment due to collective pitch 659 is the product 661 of difference 663 multiplied by product 611. Difference 663 is product 613 subtracted from sum 615. The upper CPMS limit increment due to collective pitch 657 once determined, because it is an increment would then be added to the conventional upper CPMS limit to form the adjusted upper CPMS limit.

The system of lookup tables 619, 621, 639, 641, and 643 combined are based upon the influence of nacelle angle relative to the amount of longitudinal and lateral flapping per degree of collective pitch. These lookup tables are tuned using empirical data and knowledge of the accuracy of the flapping measurements and the flapping stop limit.

This system and method provides several benefits to rotorcraft that experience flapping resulting from collective pitch. First, the system and method allow the aircraft to predict flapping resulting from collective pitch. Second, because the aircraft can predict the flapping resulting from collective pitch the reaction to the flapping resulting from collective pitch is with less delay then those systems that must measure the flapping resulting from collective pitch and then react. Third, this system and method does not impact aircraft performance such as lowering the rate limits on collective pitch inputs or limiting power lever input rates, and therefore this system and method does not degrade performance.

It is apparent that a system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A rotary aircraft, comprising:
   a rotor blade;
   a nacelle; and
   a flight control system, having:
     a first sensor associated with the nacelle, the first sensor being configured to detect an angle of the nacelle;
     a second sensor associated with the rotary aircraft, the second sensor being configured to detect a first flight parameter of the rotary aircraft;
     a third sensor associated with the rotor blade, the third sensor being configured to detect a lateral flapping movement and a longitudinal flapping movement of the rotor blade;
     a collective pitch parameter; and
     a subsystem associated with the first sensor, the second sensor, the third sensor, and the collective pitch parameter, the subsystem having:
       a first loop associated with the first sensor, the second sensor, the third sensor, and the collective pitch parameter, the first loop being configured to determine a lower longitudinal cyclic limit created by the rotor blade during flight; and
       a second loop associated with the first sensor, the second sensor, the third sensor, and the collective pitch parameter, the second loop being configured to determine an upper longitudinal cyclic limit created by the rotor blade during flight.

2. The aircraft of claim 1, the subsystem further comprising:
   a table of designated longitudinal flapping values, the table of designated longitudinal flapping values being associated with the first and the second loop; and
   a table of designated lateral flapping values, the table being associated with the first and the second loop;
   wherein the flight parameter sensed by the first sensor is received by the table of lateral flapping values and compared with the designated lateral flapping values to determine the lateral flapping value; and
   wherein the flight parameter sensed by the first sensor is received by the table of longitudinal flapping values and compared with the designated longitudinal flapping values to determine the longitudinal flapping value.

3. The aircraft of claim 2, wherein the longitudinal flapping value is differentiated with respect to the collective pitch parameter; and
   wherein the lateral flapping value is differentiated with respect to the collective pitch.

4. The aircraft of claim 3, further comprising:
   a second flight parameter;
   wherein the second flight parameter is multiplied by the differentiated lateral flapping value to produce a third flight parameter.

5. The aircraft of claim 4, wherein the third flight parameter is added to the differentiated longitudinal flapping value and then multiplied by the collective pitch.

6. The aircraft of claim 5, wherein the third flight parameter is subtracted from the differentiated longitudinal flapping value and then multiplied by the collective pitch.

7. The aircraft of claim 1, wherein the first flight parameter is an airspeed of the rotary aircraft.

8. The aircraft of claim 1, further comprising:
   a low pass filter,
   wherein the low pass filter is configured to filter the collective pitch parameter.

9. A rotorcraft, comprising:
   a fuselage;
   a nacelle;
   a rotor system;
   a flight control system;
   a first control power management system for production of a upper cyclic limit and a lower cyclic limit;
   a second control power management system, having;
     a first control loop, configured for determining a lower CPMS limit increment due to collective pitch;
     a second control loop, configured for determining a upper CPMS limit increment due to collective pitch;
   a first sensor associated with the nacelle, the first sensor being configured to detect an angle of the nacelle;
   a second sensor associated with the rotorcraft, the second sensor being configured to detect an airspeed of the rotorcraft from the flight control system; and
   a third sensor associated with the rotor system, the third sensor being configured to detect a lateral flapping movement and a longitudinal flapping movement of the rotor system;
   wherein the second control power management system modifies the upper cyclic limit and the lower cyclic limit produced by the first control power management system.

10. The rotorcraft according to claim 9, further comprising:
    a commanded collective pitch parameter.

11. The rotorcraft of claim 10, the second control power management system further comprising:
    a table of designated lateral flapping values resulting from the collective pitch of the rotor system, the table being associated with the first and the second loop; and
    a table of designated longitudinal flapping values resulting from the collective pitch of the rotor system, the table being associated with the first and the second loop;
    wherein the angle of the nacelle sensed by the first sensor is received by the table of longitudinal flapping values and compared with the designated flapping values to determine the longitudinal flapping value; and
    wherein the angle of the nacelle sensed by the first sensor is received by the table of lateral flapping values and compared with the designated flapping values to determine the lateral flapping value.

12. The rotorcraft of claim 11, wherein the longitudinal flapping value is differentiated with respect to the collective pitch; and wherein the lateral flapping value is differentiated with respect to the collective pitch.

13. The rotorcraft of claim 12, further comprising:

a second flight parameter;

wherein the second flight parameter is multiplied by the differentiated lateral flapping value to produce a third flight parameter.

14. The rotorcraft of claim 13, wherein the third flight parameter is added to the differentiated longitudinal flapping value and then multiplied by the collective pitch.

* * * * *